United States Patent [19]

Brundage et al.

[11] Patent Number: 4,981,281
[45] Date of Patent: Jan. 1, 1991

[54] SOLENOID CONTROLLED FLUID FLOW VALVE

[75] Inventors: Robert W. Brundage, 135 Paradise Rd., Painesville, Ohio 44077; Gene Swatty, Painesville, Ohio

[73] Assignee: Robert W. Brundage, Painesville, Ohio

[*] Notice: The portion of the term of this patent subsequent to Jun. 14, 2005, has been disclaimed.

[21] Appl. No.: 205,448

[22] Filed: Jun. 10, 1988

Related U.S. Application Data

[63] Continuation of Ser. No. 52,179, Apr. 28, 1987, Pat. No. 4,750,704, which is a continuation of Ser. No. 877,700, Jun. 20, 1986, abandoned, which is a continuation of Ser. No. 579,869, Feb. 13, 1984, abandoned, which is a continuation-in-part of Ser. No. 563,760, Dec. 21, 1983, abandoned, which is a continuation-in-part of Ser. No. 378,133, May 14, 1982, abandoned.

[51] Int. Cl.⁵ .............................................. F16K 17/06
[52] U.S. Cl. .................................. 251/30.02; 137/504
[58] Field of Search ........... 251/30.02, 129.08, 129.18, 251/129.21; 137/497, 486, 504

[56] References Cited

U.S. PATENT DOCUMENTS

| | | |
|---|---|---|
| 3,069,846 | 12/1962 | Buescher . |
| 3,791,408 | 2/1974 | Saitou . |
| 3,945,399 | 3/1976 | Tirelli . |
| 4,206,781 | 6/1980 | Salter ................................. 137/504 |

FOREIGN PATENT DOCUMENTS 1270178 6/1968 Fed. Rep. of Germany .
56-35873 4/1981 Japan .

Primary Examiner—Robert G. Nilson
Attorney, Agent, or Firm—Watts, Hoffmann, Fisher & Heinke Co.

[57] ABSTRACT

A remotely controllable fluid valve includes a solenoid-armature arrangement which functions as an electromagnetic spring having improved force-displacement characteristics over a mechanical spring. The solenoid magnetizes a pair of axially spaced, sleevelike field poles. The armature is so shaped and initially positioned relative to the field poles that: as the armature, supported in one pole, moves further into the other pole, the axial magnetic force thereon decreases at a decreasing rate with the rate of decrease being greater at higher levels of solnoid energization.

13 Claims, 2 Drawing Sheets

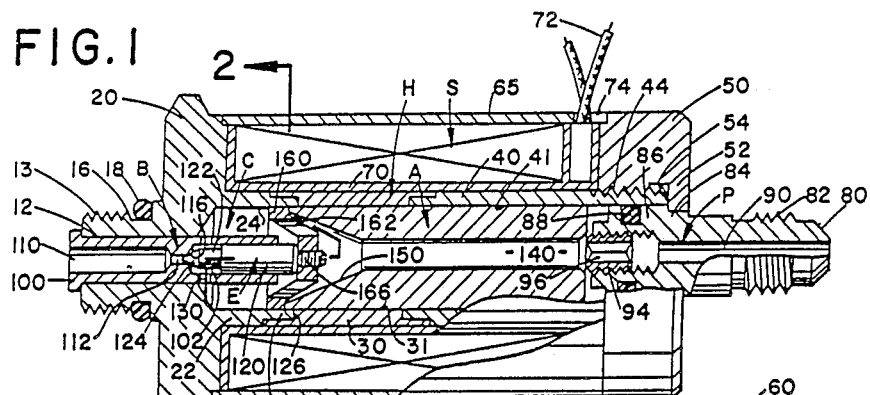
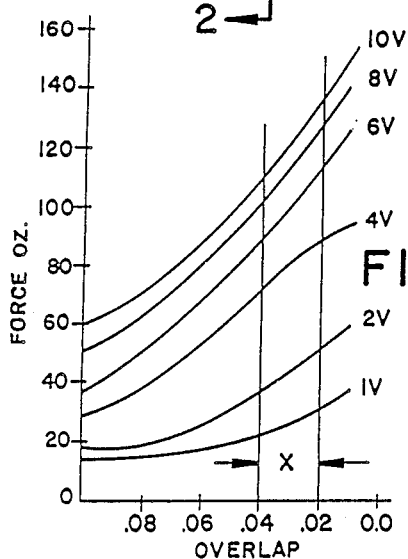
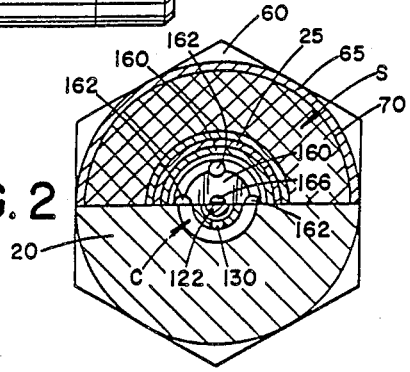
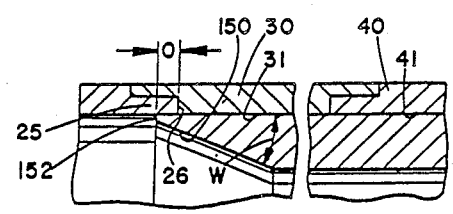
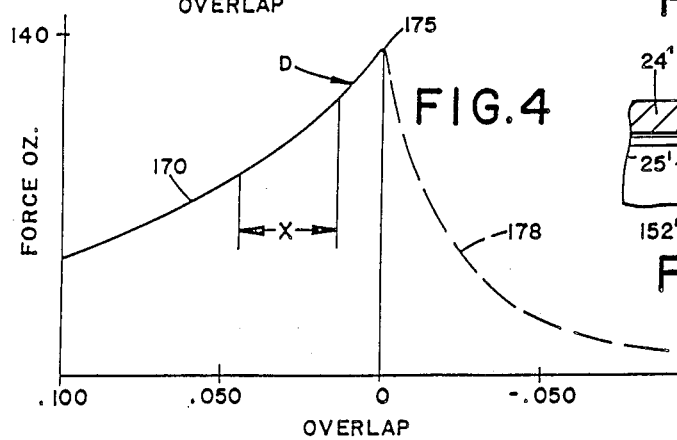
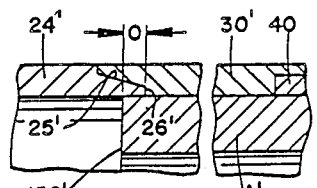

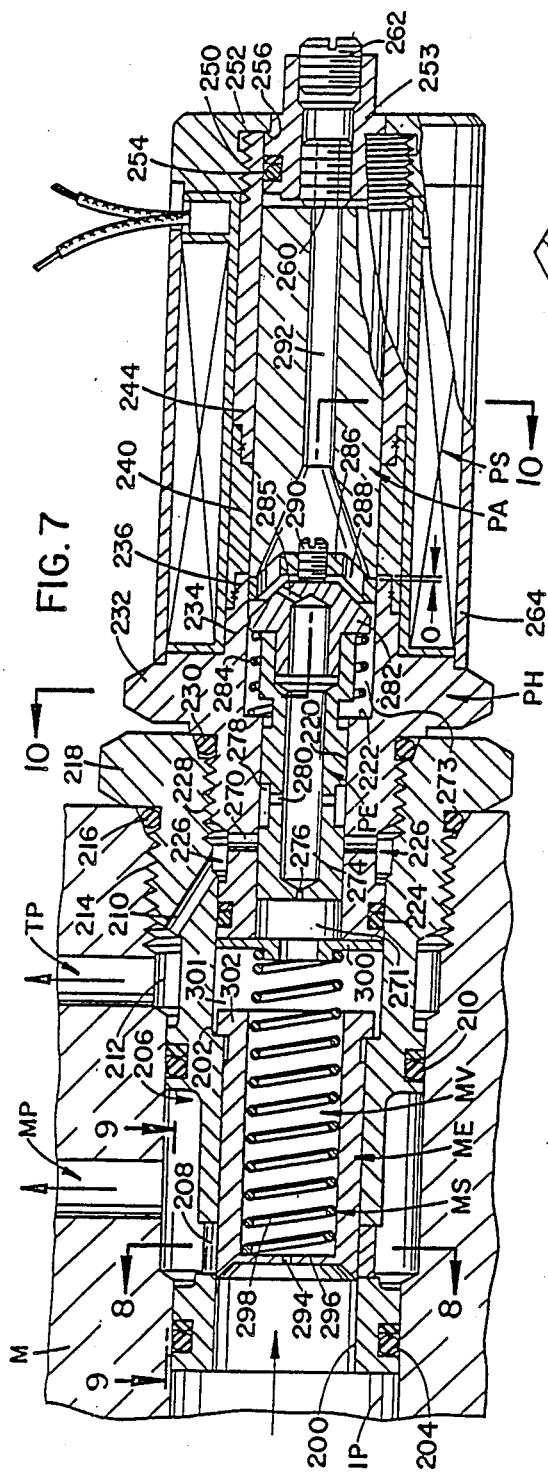

SOLENOID CONTROLLED FLUID FLOW VALVE

PRIOR APPLICATIONS

This application is a continuation of Ser. No. 052,179, filed Apr. 28, 1987, which is a continuation of Ser. No. 877,700, filed June 20, 1986, now abandoned which in turn is a continuation of Ser. No. 579,869, filed Feb. 13, 1984, now abandoned which in turn is a continuation-inpart of Ser. No. 563,760, filed Dec. 21, 1983,now abandoned which is a continuation-in-part of Ser. No. 378,133, filed May 14, 1982, now abandoned, and which in turn is related to the inventions described in my patent applications: Ser. No. 339,092, filed Jan. 13, 1982, Ser. No. 205,214, filed Nov. 12, 1980, Ser. No. 189,913, filed Oct. 2, 1980 and Ser. No. 51,844, filed June 25, 1979, the disclosure all of which specifications are incorporated into this specification by reference.

TECHNICAL FIELD

This invention pertains to the art of fluid flow valves and more particularly to a fluid flow valve employing a remotely-controllable, electro-magnetic spring for adjusting the opening pressure or volume flow through the valve.

The invention is particularly applicable to pilot-type, proportional flow or normally-open pressure-relief valves and will be described with particular reference thereto, although it will be appreciated that the invention is equally applicable to other types of spring controlled valves, either for gases or liquids and where the pressure or flow forces will not exceed the limited magnetic forces which can be developed in a solenoid having the characteristics of an electro-magnetic spring and which must be remotely controllable.

BACKGROUND ART

Pilot flow pressure control valves are extensively used for controlling the pressure at which a larger control valve will open to relieve or control the pressure in a hydraulic system. Normally, such pilot valves are comprised of a valve element having a surface or surfaces exposed to the hydraulic pressure to be controlled which creates a pressure force tending to open the valve. A compression spring biases the valve element to a closed position. When the pressure force exceeds the spring force or bias, the valve opens to allow the flow of fluid therethrough. This fluid flow then changes pressure forces on the larger valve allowing it to open and prevent further increases in the fluid pressure.

To determine the opening pressure, the amount of spring compression or bias force on the valve element is initially adjusted at the time of manufacture or is controlled in the field by means of a threaded member which is rotated either manually or by an electric motor.

The use of springs to determine the opening pressure of the valve presents three problems. First, manual adjustment prevents remote control and electric motor adjustment is expensive, bulky, relatively slow to react and requires relatively large amount of pulsed electrical power. Computer control of such valves is industrial processes is difficult.

Secondly, springs inherently give to the valve a rising pressure versus flow characteristic. Thus, as the valve opens to permit flow, the spring is compressed. As the spring is compressed, its bias force increases in direct proportion to the amount of compression. A progressively higher fluid force or fluid pressure is required to open the valve further and further. For example, with a spring having a force versus compression rate (hereinafter called "spring rate") of 30 pounds per inch, to fully open a pressure control valve 0.020 inches, requires an increase in force of 0.60 pounds. With a 0.030 inch diameter valve seat, this calculates to a pressure increase of 42.4 pounds per square inch (psi) to half open the valve and 84.8 psi to fully open the valve. This results in a rising pressure versus flow characteristic particularly at the smaller valve openings which is considered undesirable for accurate pressure control.

Thirdly, unless an expensive and complicated compound wound spring is employed, it is almost impossible to provide a spring-biased, pilot-relief valve which will perform equally well at both high and low pressures. Thus, at low pressures e.g. 100 psi, the valve must open the maximum designed amount to permit the necessary fluid flow to effect operation of the main relief valve. At the higher pressures, e.g. 6,000 psi, the valve need only open a very small amount to permit the necessary volume of fluid flow to actuate the main relief valve. Thus, if a low spring rate spring is employed to give good pressure versus flow characteristics at low pressures, when the spring is compressed to require a higher opening pressure, the valve becomes unstable.

If a high spring rate spring is employed to give stability and good pressure versus flow characteristic at higher pressure, then the pressure versus flow characteristics at low pressure are poor.

At the higher pressures, this adverse effect of a rising force-displacement characteristic of a spring, is acerbated by the apparent drop in pressure on the valve element as the valve opens due to the conversion of the pressure energy on the element to velocity energy. This effect will hereinafter be referred to as the "Bernoulli effect." The Bernoulli effect results in an apparent drop of up to about 10% in the opening pressure force on the valve element as the flow increases. This apparent lowering of the pressure force against the increasing spring bias further adversely effects the pressure versus flow characteristics of the valve.

It is known to provide electro-magnetically controlled valves employing solenoids. However, heretofore the electro-magnetic force-displacement curves of the solenoid were such as to make them unsatisfactory for use in place of a variably compressed mechanical spring.

DISCLOSURE OF THE INVENTION

The present invention contemplates a fluid valve using a new electro-magnetic spring which overcomes all of the above referred to problems, provides improved force-displacement curves over a mechanical spring and enables remote control of the opening pressures of and/or fluid flow through the valve.

In accordance with the broadest aspect of the invention, a fluid valve is provided which includes an electro-magnetic spring comprised of axially spaced, magnetically-permeable supporting and attracting sleeve-like pole pieces; a solenoid coil surrounding both sleeves; and, a cylindrical magnetically-permeable armature operatively associated with a valve element to vary the bias force thereon, the armature having a first end in radially close spaced relationship to and substantially axially overlapping the supporting sleeve and the other second end at all times in radially close spaced relationship to and slightly axially overlapping the end of the attracting sleeve. Importantly, there are only radially facing surfaces between the armature ends and the sleeves, i.e. there are no axially-facing, magnetically-permeable surfaces associated with the sleeves which are axially opposed to and axially spaced from axially-facing surfaces on the armature a distance close enough to exert any significant axial magnetic force on the armature. Physically, this involves an axial distance greater than 0.20 inches. Also, the slight overlap must exist throughout the entire designed range of movement of the armature, e.g. 0.20–0.40 in.

In such an arrangement, the solenoid, when energized, creates a magnetic flux to exert an axial magnetic force on the armature attempting to pull it into the attracting pole piece with a force which is always decreasing with increasing overlap. In effect, the armature-pole piece combination is an electromagnetic spring exerting a force like a spring, the amount of which is a function of the level of solenoid energization. Thus, by the term "electro-magnetic spring" as used in the specification and claims, is meant a solenoid-coil, magnetic pole-piece, armature combination which, over its intended or designed range of movement, acts similar to a mechanical spring, e.g. when the armature is pushed to move in a direction against the axial magnetic force and out of the attracting field pole, the force to push it increases as it moves as a result of the force.

As used in the specification and claims, "substantially overlapping" means an axial overlap of a distance at least greater than 0.5 inches, and "slightly overlapping" means an axial overlap of a distance such that if the overlap increases, the axial magnetic force decreases or vice versa. Physically, in the preferred embodiment of this invention, this represents an overlap at least greater than 0 up to about 0.100 inches. Above this maximum overlap, the axial force has decreased to such an extent as to be of no practical value in the valve.

Close spaced means that the outer surface of the magnetically permeable material of the armature is as close radially to the inner surface of the magnetically permeable material of the sleeves as the normal sliding clearances plus the thickness of any magnetically non-permeable material on the surfaces will permit.

The present invention may be distinguished from the disclosure in my U.S. Pat. No. 4,464,977 and the others filed prior thereto, where, over at least the major portion of the designed range of movement of the armature toward the attracting sleeve, the axial magnetic force increases. Such a characteristic may be used where the only opposing force is created by a spring and the exact axial position of the armature is what must be controlled.

In the present invention, in the total designed range of movement of the armature, as the "slight overlap" increases, the magnetic force decreases and vice versa. Such a characteristic, in accordance with the invention, is useful where at least part of the opposing force is a variable created by fluid pressure into and or fluid flow through the valve.

The variation in axial force of the electromagnetic spring with variations in the amount of the "slight overlap" can be pictured as a force-displacement curve, with zero displacement being either when the valve is open or when the valve is closed. However, for convenience in explaining the operation of the magnetic spring of the invention, the zero point on the displacement axis will be considered to be when the extreme end of the radially closed spaced portion of the attracted end of the armature is exactly radially aligned with the extreme end of the attracting sleeve.

As is known, a mechanical spring has a linear, rising force-displacement curve as it is compressed, and course, when used in a valve, must be provided with an initial compression to give the desired initial valve operating characteristic. The electro-magnetic spring of the present invention, through its designed range of movement, also has a rising force-displacement curve as the armature is moved in a direction to decrease the slight overlap, with beneficial differences, namely that: 1. the initial force may be zero; 2. the curve rises at an increasing rate (i.e. it is slightly upwardly concave); 3. the rate of rise is higher at higher levels of solenoid energization than at the lower levels; and, 4. the force may be remotely controlled by varying the level of solenoid energization. This latter, of course, may be done by manually adjusting either the voltage or current output of an electric power supply or by automatically varying same by means of electronic control apparatus e.g. a computer or the like. The first three of these differences enable improved valve operating characteristics while the last offers remote control of the valve operating characteristics.

The solenoid of the present invention may be distinguished from other conventional solenoids wherein the attracting pole piece and the armature have axially-facing, opposed surfaces, where, as the armature moves further and further into or toward the attracting pole piece, the axial magnetic force continually increases on a curve usually inversely proportional to the square of the spacing of the surfaces up to the maximum when the surfaces come into abutting relationship. Such a solenoid is unusable in values of the type to which this invention pertains.

As the armature attracted end moves towards and into the attracting sleeve, the attracting force first increases until, at some point in the movement, the attracting force begins to decrease. This point may vary depending on the configuration or shape of the end of the attracting sleeve or the attracted end of the armature. In accordance with the invention, in all cases over the designed range of movement of the armature, the slight overlap is such that the axial magnetic force decreases with increasing overlap with the attracting sleeve.

Further in accordance with the invention, the overlapping ends of the attracting sleeve and/or the attracted end of the armature are so shaped that at all levels of solenoid energization within the designed ranges of energization, the maximum force will occur at approximately the same amount of slight overlap whereby the same initial overlap may be used for all levels of solenoid energization. Also, the shape is such that the rate of rise of the curve has a desired slope simulating that of a mechanical spring.

To accomplish this, the attracted end of the armature or the end of the attracting sleeve must taper outwardly and in the direction of the magnetic force. To achieve such a taper on the end of the armature, the end is concave with an included angle on the metal being between 10°–80° with 30°–35° being preferred. Such a taper may be linear, stepped or arcuate, the former being preferred. At the lower angles, the curve is more linear and not as steep as at the greater angles. By varying the angle, various spring characteristics or spring rates can be achieved.

The present design differs from that of my application Ser. No. 378,133 where the attracted end of the armature has an external taper toward the end. Such a design while workable, presents problems because the point in the overlap where maximum force occurs, varies with the level of solenoid energization making it somewhat difficult to find an initial overlap, usable at all levels of solenoid energization while still getting usable levels of magnetic force. The present concave shape of the armature attracted end provides maximum magnetic force with the maximum force occurring at just greater than zero overlap at all levels of solenoid energization.

ARMATURE POSITION ADJUSTMENT

A further problem with magnetically controlled valves of the present invention, is in accurately positioning the attracted end of the armature relative to the end of the attracting solenoid field pole during manufacture sot hat the initial overlap is exactly that desired. Thus, with a magnetic force-displacement curve rising at the rate of 83 pounds per inch, every 0.005 inches variation in the amount of overlap produces 6.6 ounces difference in magnetic force. If the tolerances in the manufacture of the various pieces stack up to $\pm 0.030$ without adjustment, this will produce a $\pm 40$ ounce variation in magnetic force out of a maximum force of 120 ounces, a $\pm 33\%$ variation and unacceptable.

In accordance with the present invention, means are provided for adjusting the position of the attracted end of the armature relative to the attracting end of the solenoid field pole when the armature is biasing the valve element into engagement with the valve seat. Such means could be a shim positioned between the armature and the valve element but in accordance with the invention, is a threaded member interposed between the armature and the valve element and fixedly and axially adjusted at the time of manufacture.

In accordance with one aspect of the invention, the armature passage and outlet passage are axially aligned such that the adjustment can be made from outside of the valve housing during the assembly of the valve.

In addition in accordance with the invention, further means are provided for adjustably limiting the movement of the armature away from the valve seat such that the attracted end of the armature is always in at least partial overlapping relationship with the attracting end of the solenoid field pole in the extreme valve open position of the armature. In a preferred embodiment, such means include a threaded sleeve mounted in the end of the housing remote from the inlet port.

PRESSURE COMPENSATED PILOT FLOW VALVE

Further in accordance with the present invention, the electro-magnetic spring of the invention can be employed in a proportional flow valve wherein the axial position of a valve element variably restricts the flow of fluid through a radially opening port. Mechanical spring means bias the valve element to an initial port closed position, and the electro mechanical spring exerts a magnetic force in opposition to the forces of the mechanical spring to position the valve element relative to the radially extending port dependent on the solenoid energization.

Further in accordance with the invention, an axially facing orifice operatively associated with the valve element is provided through which all fluid flows to produce a pressure differential on opposite ends of the element and create a flow force in opposition to the electro-magnetic spring force. No bias spring is required. Pressure compensated flow results.

DEAD BAND COMPENSATION

In an electro-magnetic device where an armature moves in an amount proportional to the amount of solenoid energization, at the lower levels very little magnetic force is developed, in fact, not enough to overcome static friction, otherwise known as "striction". If the power supply voltage output to the solenoid is variable from 0 as a base to the maximum e.g. 12 volts, by means of manual control, there is a dead band in the movement of the control where there is no apparent movement of the armature and no apparent effect on the fluid flow through the valve being controlled.

In accordance with the invention, light spring means are provided to lightly bias the armature to an initial position, either fully on or fully off and the power supply has a minimum voltage output above zero e.g. 1.5 to 2 volts for energizing the solenoid to produce a force just less than the opposing spring bias while the controller for the power source output voltage indicates zero. As a result, the dead band is eliminated and even small movement of the controller results in an immediate movement of the armature.

OBJECTS

The principal object of the present invention is the provision of a new and improved fluid valve having an electro-magnetic spring which has improved force-displacement curves over a mechanical spring, which can be remotely controlled and which is simple in construction and operation.

Another object of the invention is the provision of an electro-magnetic spring wherein the linearity of the force-displacement curve can be varied at the time of manufacture.

Another object of the invention is the provision of an electro-magnetic spring for use in fluid valves which has a steeper force-displacement curve at higher levels of electrical energization than at the lower levels of the electrical energization.

Another object of the invention is the provision of an electro-magnetic spring for use in fluid valves which can be used to remotely control the opening pressure of a relief valve as well as the flow through a proportional, flow or sequencing valve.

Another object of the invention is the provision of an electro-magnetic spring for fluid valves which has an increasing spring rate as the spring is compressed in its range of movement.

Another object of the invention is the provision of an electrically controlled springless fluid valve.

Another object of the invention is the provision of a solenoid controlled fluid valve wherein the solenoid acts like and gives improved performance characteristics over a spring.

Another object of the invention is the provision of a solenoid controlled fluid valve having improved characteristics over that of a spring controlled valve.

Another object of the invention is the provision of a new and improved pressure relief or flow valve wherein the relief pressure or flow is readily controlled by electro-magnetic means.

Another object of the invention is the provision of a new and improved electrically operated fluid valve wherein manufacturing tolerances can be readily compensated for at the time of assembly.

Another object is the provision of an arrangement where initial changes in the solenoid energization produce substantially automatic changes in the position of its armature.

Another object is the provision of a spring to lightly bias the armature to an initial position in combination with a variable voltage power source having a minimum base output voltage to create a magnetic force on the armature just less than the spring bias.

Still another object of the invention is the provision of a new and improved solenoid magnetic circuit wherein the ends of the armature or of the solenoid field pole are so shaped as to provide a higher than heretofore available magnetic force at the maximum solenoid energization.

Another object of the invention is the provision of a new and improved magnetic solenoid circuit wherein the ends of the armature or the solenoid field pole are so shaped that the magnetic force displacement curve over the operating range of the armature will have an increasing slope with increasing degrees of solenoid energization.

BRIEF DESCRIPTION OF THE DRAWINGS

The invention may take physical form in certain parts and arrangement of parts, a preferred embodiment of which will be described in detail in this specification and illustrated in the accompanying drawing which form a part hereof and wherein:

FIG. 1 is a side cross-sectional view partly in elevation showing a normally open, electrically controlled, pilot-type pressure relief valve illustrating a preferred embodiment of the invention;

FIG. 2 is a cross-sectional view of FIG. 1 taken approximately on the line 2—2 thereof;

FIG. 3 is an enlarged fragmentary view of FIG. 1 showing the overlap of the attracted end of the armature with the end of the attracting solenoid pole pieces in the valve closed position;

FIG. 4 is a magnetic force-displacement curve of the armature for negative and positive overlaps with the solenoid attracting field pole;

FIG. 5 is a set of magnetic force-displacement curves on the armature of FIG. 1 for varying solenoid energizing voltages;

FIG. 6 is a view similar to FIG. 3 showing an alternative embodiment of the invention;

FIG. 7 is a side cross-sectional view of a flow valve controlled by a pressure compensated proportional flow valve illustrating an alternative embodiment of the invention;

FIGS. 8, 9 and 10 are cross-sectional views of FIG. 7 taken approximately on the lines 8—8, 9—9 and 10—10 respectively; and, FIG. 11 shows armature displacement-solenoid energizing voltage curves of the embodiment of FIG. 7.

Referring now to the drawings, wherein the showings are for the purposes of illustrating preferred embodiment of the invention only, and not for the purposes of limiting same; FIGS. 1 and 2 show an electrically controlled hydraulic pressure relief valve comprised generally of an elongated housing H having an internal cavity C, a solenoid coil S surrounding the housing, a solenoid armature A slidable in the cavity, a valve seat forming member B, a valve element E biased toward the valve seat by the armature A and an outlet port forming member P, all assembled into a single compact unit.

The housing H is generally comprised of three members assembled into a single unitary member preferably by brazing and includes a lefthand member 10 of magnetically permeable material, which reading from left to right, includes a boss 12, having external threads 14, a groove 16 in which an O-ring 18 is positioned, a hexagonal portion 20 of larger diameter and a sleeve portion 22 having an internal cylindrical surface 24, and an externally rabbeted right end 25 terminating in a righthand facing surface 26 perpendicular to the axis and intersecting the surface 24 at a right angle.

The housing further includes a sleeve 30 of magnetically non-permeable material, having an internal surface 31 of the same diameter as the surface 24, an internally rabbeted left end which mates with the rabbet on the right end of sleeve 22. The righthand end of the sleeve 30 is also internally rabbeted. The housing further includes a sleeve 40 of magnetically permeable material, having an internal surface 41 of a diameter the same as surface 24 with its lefthand end externally rabbeted to receive and mate with the rabbet on the right end of sleeve 30. These rabbeted surfaces are preferably brazed together so that the members 10, 30 and 40 are structurally integral and with surfaces 24, 31 and 41 defining cavity C. The righthand end of sleeve 40 has external threads 44 to receive and mate with the internal threads of a magnetically permeable material end cap 50 which includes a radially inwardly extending flange 52 defining an opening therethrough of a diameter less than the diameter of the surface 41, to thus provide a lefthand facing shoulder 54, for purposes which will appear hereinafter.

In embodiment shown, the remaining portion of the rabbeted righthand end of the sleeve 22 is approximately twice the thickness of the remaining portion of the lefthand rabbeted end of the sleeve 30. In the same way; the remaining portion of the rabbeted end of the sleeve 40 is approximately twice the radial thickness of the remaining portion of the righthand rabbeted end of the sleeve 30. In effect, the magnetically nonpermeable sleeve 30 has what may be called a "T" cross section. This gives an improved magnetic circuit because the ends of the poles are adjacent the surface of the cavity and the armature A. If it were possible to obtain the mechanical strength and the exact axial alignment of the sleeves 22, 30 and 40, it would be possible to eliminate the rabbeting of either the sleeve 22 or 40, and from a magnetic standpoint, this would be preferable. Instead of a brazed joint between the rabbets, they could be threaded although such construction is more difficult to machine and to maintain in exact axial alignment.

The righthand outer corner of portion 20 is rabbeted to receive the lefthand end of a magnetically permeable cylindrical housing 65, which extends into abutting engagement with the lefthand end of the cap 50 and provides a housing for the solenoid S.

SOLENOID

The solenoid S is relatively conventional in construction and includes a plurality of turns of electrically insulated wire wound onto a bobbin 70 and has a pair of power leads 72 extending outwardly through a slot 74 in the righthand end of the housing 65.

The solenoid S, for best operation, must surround i.e. overlap both sleeves 22 and 40 which are of magnetically permeable material and form its field poles.

The solenoid S may be energized from any suitable power source. Preferably the power supply is one which delivers a current constant at any preset value. With such an arrangement as the solenoid heats and its resistance changes, the current in the solenoid will remain the same and thus the magnetic force on the armature A will remain the same resulting in a valve having a constant opening pressure at any preset value. A constant voltage power supply can be used, but with a result that there may be some variation in the opening pressure as the valve heats and the resistance of the solenoid coil changes. Dither or pulse width modulated energization causes the valve to be unstable and should not be employed.

OUTLET PORT FORMING MEMBER

The outlet port forming member P has on its right end means for being detachably and sealingly coupled to a hydraulic hose, such as the conical surface 80, and threads 82. The member P includes a central portion 84 of a diameter to fit within the opening of the flange 52 and a lefthand portion 86 of a greater diameter to fit within sleeve 40 and form a shoulder, abutting shoulder 54. Portion 86 has a groove in which an O-ring 88 is positioned for sealing against the inner surface 41 of sleeve 40. The member P has a longitudinal passage 90 opening through the conical surface 80 and at its left end has a threaded counterbore in which a "Mac-it" sleeve screw 94 is threadably engaged. Such a screw has a self-locking characteristic in any adjusted position. The sleeve screw 94 has a longitudinal, hexagonally shaped passage 96 to coact with a suitable adjusting tool such as an "Allen" wrench. The diameter of the passage 90 is such as to permit the passage of such "Allen" wrench.

VALVE SEAT AND ELEMENT MEMBERS

The valve seat member B is in the form of an elongated tubelike member sealed in a cylindrical opening in the member 10 and has a flange 100 on its lefthand end abutting against the lefthand end of the threaded boss 12. Member B extends into the cavity C and its right end has a counter bore 102 in which the valve element is slidably supported. The member B also has a counter bore 110 in its left end which is communicated with the bore 102 by a drilled passage 112, which at its right end defines with the base of the bore 102, a valve seat 116.

The valve element E is comprised of a cylindrical portion 120 of a diameter to be slidably supported in the bore 102, and a lefthand portion 122 of reduced diameter, the lefthand end of which is conically shaped as at 124 to form a valve seat engaging surface for engaging the valve seat 116. The diameter of this valve seat defines the area of the inlet port and thus for a given inlet pressure a determinable pressure force to the right on the valve element E tending to open the valve. The diameter of passage 112 is 0.031 inches for 6,000 psi, 0.043 inches for 3,000 psi and 0.058 for 1,5000 psi, maximum inlet pressure. Cross drilled passages 130 communicate the base of the bore 102 with the cavity C.

With this arrangement of the valve seat member B and valve element E, the passage 112 and valve seat 116 are formed at the base of a relatively short cylindrical counter bore and the valve element E is slidable within this bore with its valve seat engaging surface in close proximity to the cylindrical surfaces of its cylindrical portion 120. Maintaining the tolerances on such surfaces during manufacture and thus alignment on assembly is much easier than if the valve seat 116 were formed at the base of the cavity formed by the sleeves 24, 30 and 40. In addition, there are no side or lateral forces on the valve element E which would tend to move its valve seat engaging surface out of alignment with the valve seat engaging surface 116. It is believed that this construction is novel in a high pressure valve where precision and exact alignment of a metal valve seat and it engaging metal surface is necessary.

ARMATURE

The armature A is generally cylindrical and of an outer diameter to be slidingly supported by the inner surfaces of sleeves 22, 30 and 40. The armature A is made from magnetically permeable material and preferably has its outer surface coated with a thin, approximately 0.001-0.003 inch thickness of Teflon or other antifriction, magnetically non-permeable material. The armature A has a longitudinal passage 140, of a predetermined diameter, which forms a viscosity sensitive orifice for the flow of released fluid from the lefthand end of the valve through and out of the righthand end of the valve.

The lefthand end of the armature A is concave with the concavity being defined by a conical surface 150 which tapers outwardly from passage 140 toward the valve seat 116 at an angle with the outer surface terminating in a narrow axially facing surface 152. As will appear, the size of angle W and the width of surface 152 have an important effect on the performance characteristics of the valve. This included angle may vary from 20° to 80°, with 35° being preferred. The left end of armature A i.e. surface 152 slightly overlaps the right end of sleeve 22 by a distance 0 which is critical to the proper operation of the magnetic circuit and thus the valve.

Also the left end of the magnetically permeable portion of armature A is as radially close spaced to the radially inwardly facing surface 22 as the working or sliding clearance plus the thickness of any antifriction material will permit.

A magnetically non-permeable spacer member 160 is provided between the lefthand end of the armature A and the righthand end of the valve piston V, which spacer member 160 has an outer diameter so as to be slidable within the cylindrical surface 24 and has a plurality of axial passages 162 therethrough. The center portion of spacer 160 has a set screw 166 extending therethrough. The lefthand end of which engages the righthand end of the valve element E and the righthand end of which is aligned with passage 140 and slotted to engage a screwdriver.

The lefthand axially facing surface 152 of armature A abuts against a corresponding righthand end axially facing surface on spacer 160 such that when armature A has a magnetic force to the left exerted thereon, it biases spacer 160 to the left which, through screw 166, in turn biases the valve piston V to the left i.e. to the valve closed position. By "biasing" is meant an axial force in one direction which when exceeded by an axial force in the opposite direction results in movement of the armature in the latter direction until the forces are in balance or the armature has reached the physical limit of its movement in that direction.

Screw 166 is adjusted by means of an elongated screwdriver inserted through passage 90 in member P, passage 96 in the sleeve screw 94, and passage 140 in the armature A.

Screw 166 enables exact adjustment of the position of the lefthand of armature A i.e. of overlap W after the valve has been assembled. Such exact adjustment is necessary to the proper operation of the magnetic circuit as will appear.

MAGNETIC CIRCUIT

In accordance with the invention, the member 10, (which includes portion 20, sleeve 22), the sleeve 40 and cap 50 are all formed of magnetically permeable material to form spaced field poles for the solenoid S. Sleeve 30 is formed of magnetically non-permeable material and forms what may be termed a magnetic airgap for the solenoid S which, when electrically energized, generates a magnetic flux of opposite magnetic polarity at each end. As such, portion 20 and sleeve 22 will always be of opposite magnetic polarity from sleeve 40 and cap 50.

Further in accordance with the invention, the armature A is also formed of magnetically permeable material, and as shown, includes a righthand supported portion which substantially overlaps the sleeve 40 which hereinafter may be called the supporting field pole of solenoid S.

The lefthand end of the armature A may be termed the attracted end of the armature, and must slightly overlap at all times the righthand end of sleeve 22 which may be termed, the attracting field pole of solenoid S. Importantly, there are no axially aligned and opposed magnetically permeable surfaces on the armature A and the two sleeves close enough to result in any appreciable magnetic forces between the two.

Also, importantly the radially facing surfaces of the magnetically permeable surfaces have the minimum possible clearances consonant with the working or sliding clearances and the thickness of any antifriction coatings which intentionally limits the minimum airgap. This provides the maximum axial force while restricting the radial force, the latter of which creates friction opposing axial movement.

When the solenoid S is electrically energized, a magnetic flux is generated, which then flows into and through the magnetically permeable members, namely, radially through the cap 50, axially through the sleeve 40, radially into the armature A, axially through the armature A to its lefthand attracted end, radially into the sleeve 22, axially through the sleeve 22, and radially through the sleeve 60. Sleeve 65 is of magnetically non-permeable material.

This magnetic flux creates a magnetic force on the armature A pulling it to the left, that is toward the valve seat 116, with a force which for a constant energization of solenoid S, varies in accordance with the amount of overlap 0.

MAGNETIC FORCE CURVES

In FIG. 4, curve D shows the variation in the axial magnetic forces on the armature A as the amount of overlap 0 varies from less than 0 (negative overlap) to 0 to 0.100 inches (positive overlap) for 10 volts of solenoid energization and an angle W of 35°, the solid line 170 indicating measured valves in the usable ranges of overlap and the dashed line 178 indicating estimated values in the unstable, unusable ranges of overlap, zero being where the ends of the attracting sleeve and the attracted portions of the armature are aligned.

As shown by curve 178, the axial magnetic force on the armature A as the end of the armature approaches the end of the attracting sleeve increases rapidly from a low value on what is believed to be a hyperbolic curve where the force is inversely proportional to the square of the negative overlap to a maximum at 175 of approximately 140 ounces at zero overlap. Thereafter, curve 170 shows the force decreasing at a generally decreasing rate until the armature A is magnetically centered relative to the air gap. Dimension X indicates the range of the curve, about 0.020 inches, used in the preferred embodiment.

FIG. 5 shows the variation in axial magnetic forces on the armature A from zero overlap to a maximum of 0.100 inches with curve IV representing 1 volt solenoid energization, curve 2V two volts, curve 4V four volts, curve 6V six volts, curve 8V eight volts and curve 10V, the maximum designed energization voltage of ten volts. These curves represent the magnetic forces on the armature A biasing it to the left and thus the valve element 120 to the valve closed position.

The included angle W may vary from 20° to 80°. At the lower angles there is a sacrifice of maximum force, but with the point of maximum force C occurring essentially at the same amount of overlap energization for all levels of solenoid energization. At the higher angles, there is a higher maximum force but with the point of maximum force occurring at different amounts of overlap with differing degrees of solenoid energization. A reasonable compromise between maximum force and location of the maximum force is attained with angles of 20°-40° with 35° being preferred.

Also the width of surface 152 affects the operation with greater widths acting the same as variations in the angle W. With a 30° angle and up, a width of 0.005 inches is preferred. With a 20° angle a width of 0.040 inches is preferred.

The initial overlap is so chosen that at all levels of solenoid energization, the magnetic force is increasing as the overlap decreases through the maximum designed range of movement of the valve element. In effect, the arrangement acts like an electro-magnetic spring biasing the valve element to the closed position, with the force of the spring being remotely controllable by varying the solenoid S energization.

OPERATION

In operation, hydraulic pressure on the left end of the valve element 120 creates a hydraulic force to the right in opposition to the magnetic force on the armature A. When the hydraulic force exceeds the magnetic force, the valve element 20 is moved to the right forcing the armature A to move to the right, but as the armature A is moved to the right, its force to the left increases, thus opposing the opening of the valve in the same manner as a mechanical spring with its increasing force as it is compressed.

The valve shown has a maximum opening of 0.20 inches, and in accordance with the invention, the initial amount of overlap 0 in the valve closed position is adjusted to approximately 0.040 inches. As the valve opens to its maximum, the overlap will decrease to 0.020 inches.

By adjusting screw 166, the amount of initial (i.e. valve closed) overlap 0 may be readily adjusted. By adjusting screw 94, the maximum movement of the armature A to the right, and thus the minimum overlap may be readily adjusted, all at the time of assembly of the valve.

The slope of each curve, 1V, 2V, 4V, 6V, 8V and 10V increases with decreasing overlap. Thus, for any level of solenoid energization, the force required to open the valve increases in a non linear manner resulting in improved pressure vs flow characteristics. Also, the relative slopes of the curves progressively increase with increasing energization. Inasmuch as the opening pressure of the valve is a function of the degree of energization of the solenoid, it will be appreciated that the electro-magnetic spring described has a force-displacement rate at the higher pressures which is above that at the lower pressures.

BERNOULLI EFFECT COMPENSATION

When the valve opens, fluid flows inwardly through passage 112, through port 130 into cavity C than through ports 162 and longitudinally through the passage 140 in armature A. This passage in the preferred embodiment has a diameter of 0.250 inches, functions as an axially facing orifice restricting the flow of fluid with a result that there is a pressure drop between the left and right ends of armature A creating a hydraulic flow force to the right on the armature A proportional to the volume of fluid flowing. By varying the diameter of this passage, the flow force can be varied. This hydraulic flow force being to the right, in effect subtracts from the left-hand magnetic force of the armature A on the valve element resulting in a valve having improved flow characteristics. Obviously, the orifice could be formed on or in member 160. Also, the outlet passage could be through the side of the cavity by the formation of appropriate ports.

The valve described is a normally open valve which is closed when the solenoid is energized, the amount of energization determining the opening pressure. For all pressures below the maximum, the valve may be used as a simple on-off valve by simply turning on or off full energization of the solenoid.

In the embodiment shown in FIG. 3, the end of the attracting sleeve adjacent to the magnetic air gap has a substantial radial thickness and a surface which is perpendicular to the axis while the attracted end of the armature A tapers generally to a blunt point. With this construction, the magnetically permeable material in the end of the armature A saturates at the higher levels of solenoid energization with the result that the slope of the force-displacement curve increases at the higher degrees of solenoid energization.

FIG. 6 shows an alternative embodiment of the invention where like parts will be given like numbers with a primemark (') added. In this embodiment, the left end 152' of armature A' is perpendicular to the axis, while the outer surface 25' of the rabbit on the right end of the attracting sleeve 24' tapers outwardly toward the valve seat and surface 26' has the same radial width as surface 152 in the preferred embodiment. This embodiment is the equivalent of the preferred embodiment in terms of magnetic characteristics.

It is also possible to divide the taper between the armature end and the attracting sleeve end with equal results.

FIG. 7 shows an electrically controlled flow valve assembled with a manifold housing M and including: a main valve MV comprised of a main valve housing MH and a main valve element ME biased to a closed position by a main spring MS; and, a pilot valve PV comprised of a pilot valve housing PH; a pilot valve element PE; a pilot valve armature PA; a solenoid coil PS for creating a magnetic force on the armature PA and biasing it to the left; and a spring PS for biasing the valve element against the magnetic force on the armature PA.

The manifold housing M forms no part of the present invention and is shown simply for the purposes of illustration. It includes an inlet passage IP, a main outlet passage MP and a tank passage TP.

The main valve housing MH is comprised generally of a single machined member of any desired material, brass, steel, stainless steel or aluminum and has an internal cylindrical passage 200 opening through the left end to form an inlet port and which is counter-bored at the right end to provide a lefthand facing shoulder 202. Externally, the main valve housing MH, (reading from left to right) includes: a groove to receive an O-ring seal 204; a portion of reduced diameter to provide with the manifold housing M an outlet manifold 206 to main outlet passage MP; rectangular main outlet ports 208; a groove to receive an O-ring seal 210; a portion of reduced diameter to provide with manifold housing MG an outlet manifold 212 to the tank passage TP; a threaded portion 214 mating with threads on the manifold housing M; a groove to receive an O-ring seal 216 and a portion of a larger diameter 218 which is hexagonally shaped to receive and coact with a wrench or the like.

Additionally, the housing MG has a passage 210 communicating the tank passage manifold 212 with the interior of the main valve housing MH just to the right of the lefthand end of the pilot valve housing PH.

The pilot valve housing PH has an internal cylindrical passage 220 opening to the left and counterbored at its right end to provide a righthand facing shoulder 222. Externally, the pilot valve housing PH (reading from left to right) includes a boss 223 of an outer diameter to fit into the counterbored end of the main housing MH; a groove to receive an O-ring seal 224 which seals against the inner wall of the main valve housing MH; a portion of reduced diameter to provide a manifold 226 communicating with passage 212 and tank port TP; a threaded portion 228 to mate with threads on the inside of the main valve housing, a groove to receive an O-ring seal 230, a portion of larger diameter 232 which has a hexagonal outer shape to receive a wrench and a sleevelike portion 234 extending to the right and externally rabbeted to provide a portion of reduced diameter 236. At least portions 232 and 234 are formed of magnetically permeable material.

The housing PH also includes a sleeve of magnetically nonpermeable material 240 internally rabbeted at both ends and having an inner surface of the same diameter as the inner surface of the sleevelike portion 234.

The pilot valve housing PH also includes a sleeve 244 of magnetically permeable material, externally rabbeted on the left end to mate with the rabbets of the nonmagnetic sleeve 240 and an inner surface having a diameter the same as sleeve 234.

The pilot valve housing PH further includes a cap 248 of magnetically permeable material threaded onto the righthand end of sleeve 244, which cap has a flange 252 extending radially inwardly to a diameter just less than the inner diameter of sleeve 244.

An end sealing member 253 of magnetically nonpermeable material extends into the righthand end of sleeve 244 and has a groove in its outer surface to receive an O-ring seal 254 which engages the inner surface of sleeve 244, and a portion of reduced diameter to provide a shoulder which abuts against the lefthand facing surface of flange 252. Member 253 also has a threaded bore in which a sleeve screw 260 is mounted in the lefthand end and a plug 260 in the righthand end.

Pilot valve solenoid PS surrounds and overlaps sleeves 234, 240 and 244 and includes an outer housing 264 of magnetically permeable material which extends into abutting overlapping relationship with the portions 232 and cap 248 generally as shown.

Adjacent to the lefthand end of pilot housing PH, a pair of crossed drilled openings 270 provide pilot valve outlet ports nominally communicating passage 220 with the manifold 226.

Pilot valve element PE is movably supported in passage 220 for the purpose of dividing same into a high pressure inlet chamber 271 and an intermediate pressure chamber 273 and variably restricting ports 270 communication with chamber 273. Pilot valve element PE in the embodiment shown, is formed of magnetically nonpermeable material and includes a central passage 274 communicated to the lefthand end through an axially facing orifice 276. Pilot valve element PE also includes an external groove 278 communicating with passage 274 by a cross drilled openings 280. The righthand end of pilot valve member PH is counterbored to receive a magnetically nonpermeable insert 282 having on its right end a ported flange of a diameter larger than the outer diameter of pilot valve element PE to provide a lefthand facing shoulder against which a pilot valve spring 284 abuts and at the opposite end abuts against the shoulder 222 to bias the pilot valve element to the right. Spring 284 has a drilled passage 285 communicating pressures in bore 274 with the righthand end of the cavity defined by the sleeves 234, 240 and 244.

A magnetically nonpermeable spacer member 286, having axial extending passages 288, is positioned to the right of the insert 282 and has a threaded member 290 abutting against the righthand surface of insert 282. Spacer 286 has a diameter such as to slide freely in sleeve 234.

The pilot valve armature PA is formed of magnetically permeable material and has an internal passage 292 and an outer coating of Teflon or other anti-friction material of a thickness of between 0.001 and 0.003 inches, preferably the inner surfaces of sleeves 234, 240, 244 are also Teflon coated as well as sleeves 22, 30 and 40.

The main valve element MV is generally in the shape of a cup having an axially facing orifice 294 in its base 296 and is lightly biased to the left by a spring 298 bearing at its left end against the base of the cup 296 and at its right end against a flanged washer 300 which abuts against the lefthand end of the pilot valve housing PH. Main valve element MV defines with cavity 200, a variable pressure chamber 301. Spring 298 in the preferred embodiment has a spring rate of 80 pounds per inch and an initial compression force of 5 pounds.

The main valve element MV has a flange 302 on its righthand end which abuts against the shoulder 202 to limit its movement to the left. The lefthand end of the valve element extends to the left of the lefthand side of the main outlet ports 208 with a slight overlap generally as shown. Movement of the main valve element ME to the right, restrictively communicates the inlet port with port 208 allowing flow of fluid therethrough in an amount proportional to the amount of the opening of 208 and the inlet pressure.

POWER SOURCE

The power source for the pressure compensated flow valve is preferably a variable D.C. source having a minimum output voltage sufficient to create an axial magnetic force on armature PA just equal to the force of spring 284 when groove 278 is just about to communicate with openings 280, this minimum voltage being present even though the controller for the source indicates zero output voltage. As such, even a slight movement of the controller towards increased voltage results in movement of the armature PA and a change in the relative position of groove 278 and ports 280. This minimum voltage is about 2 volts.

Preferably, the source also superimposes a conventional square wave dither voltage on the D.C. output voltage.

Curve 350 of FIG. 10 shows the armature displacement-vs. controller position (apparent to the operator) when using two volts minimum compared to a similar curve 352 where the minimum output voltage is zero, the curves on the negative sides of the axes being what would be true if the armature were to move bidirectionally as in some of my earlier applications.

With this arrangement, the controller can be calibrated directly in fluid volume per minute of flow.

OPERATION

In operation with the solenoid PS unenergized, the various valve elements will be in the position shown and inlet pressure flows through orifice 294, orifice 276 and orifice 285 such that in the valve shown, the entire inside of the two housings PH, PH will be at inlet pressure. Valve member ME is thus in hydraulic pressure force balance and is biased to the left by spring 298.

Spring 284 biases the pilot valve element PE and along with it spacer 286 and the armature PA to the right such that groove 278 and pilot valve outlet ports 270 are substantially closed from communication with each other.

In this position, the lefthand end of armature PA has an overlap 0 with the righthand end of the rabetted portion 236 and the lands between groove 278 and ports 270 have a slight overlap.

When the power source is first energized, even though its controller indicated zero output voltage, its minimum output voltage energizes solenoid PA to create a magnetic force on armature A just less than or equal to the force of spring 284.

When the solenoid is further energized, the magnetic force created on armature PA causes it to move to the left against the bias of spring 284 bringing groove 278 into communication with pilot valve outlet ports 270. Hydraulic fluid flows from the inlet through orifice 294, first intermediate pressure chamber 271, orifice 276, second intermediate pressure chamber 274, passage 280, outlet port 270, passage 210, and manifold 212 to the tank. Such a flow produces a pressure drop across orifice 294. This creates a flow force to the right causing it to move to the right against the bias spring 298 and communicating the inlet port with ports 208.

Flow of fluid through orifice 276 creates a pressure drop thereacross resulting in a flow force to the right on pilot valve element PE. This force is opposed by the magnetic force to the left on armature PA.

The pilot valve element PE reaches a position relative to outlet port 270 where the magnetic forces of armature PA, forces of spring 284 and the flow forces are in balance. If the inlet pressure should drop whereby the pressure drop across orifice 276 should drop, the magnetic force will move the pilot valve element to the left to increase the degree of communication with outlet port 270 and maintain a constant flow to orifice 294 and orifice 276 regardless of variations of the inlet pressure.

By varying the energization of solenoid coil PS, the magnetic force to the left on armature PA can be varied, which will thus vary the rate of fluid flow through orifices 294 and 276. Variation in the flow of fluid through orifice 294 varies the flow force to the right against the bias of spring 298 resulting in movement of the main valve element ME to vary the communication of inlet with the outlet 208. The outlet ports 208 is rectangular having two circumferentially extending sides. Flow through port 208 is thus directly proportional to the axial movement of element ME.

It is important that the overlap of the left end of armature PA and the right end of a reduced portion of 236 of sleeve 230 be such that when armature PA moves to the left against the force of spring 284, the magnetic force decreases. In effect, the solenoid coil and the armature create what may be termed an electro-magnetic spring, the force of which may be varied by varying the energization of the solenoid PS.

A flow valve results whereby a constant flow through the valve can be obtained for any setting of solenoid PS energization.

The righthand surface of main valve element ME defines with the cavity a variable pressure chamber 271 which pressure varies with the amount of fluid flowing through pilot valve PV as determined by the energization of solenoid coil PS. Obviously, the orifice 294 communicating the inlet port with this variable volume chamber 271 can be other than as shown and through the housing or through a separate passage externally of the housing.

Above a predetermined inlet pressure, the pressure flow force to the right on element PE is a function of the pressure drop across and thus the diameter of orifice 276 and the area of the left end of element PE, both of which are determined at the time of manufacture to correspond to the maximum magnetic force capabilities of the solenoid-armature combination.

In the preferred embodiment, the diameter of element PE and orifice 276 are 0.500 inches and 0.042 inches respectively. Solenoid PS has 940 turns of 24 gage copper wire and a 9 ohm resistance.

In a similar manner, the pressure force on element ME is a function of the pressure drop across, and thus the diameter of, orifice 294 multiplied by the area of the left end of element ME. In the preferred embodiment, the diameters of element ME and orifice 294 are 0.625 inches and 0.03125 inches respectively. These dimensions are proportioned to act with the spring rate of spring 298.

Thus, it will be seen that a variable pressure relief valve has been provided which does not require a mechanical spring. I believe I am the first to have ever done this. Further, a solenoid armature arrangement has been provided that has improved performance characteristics over a mechanical spring of equivalent force rating. In fact, the arrangement may be termed an electro-magnetic spring.

The invention has been described with reference to preferred embodiments. Obviously, modifications and alterations will occur to others upon reading and understanding of this specification, and it is my intention to include all such modifications and alterations insofar as they come in the scope of the appended claims.

We claim:
1. An electrically controlled, normally closed, pressure compensated flow valve comprising:
   (a) a housing having a cylindrical valve cavity communicating with inlet and outlet flow ports and a cylindrical armature cavity;
   (b) a movable, normally closed, valve member mounted in the valve cavity including a fixed orifice means and structure at least partially defining a variable orifice means for variably communicating said inlet and outlet flow ports, said fixed and variable orifice means disposed in serial fluid communication;
   (c) a magnetically permeable armature movable in said armature cavity and adapted to bias the variable orifice structure of said valve member into variable communication with one of the flow ports;
   (d) a solenoid including:
      (i) a solenoid coil;
      (ii) an armature attracting annular pole piece comprising a portion of the armature cavity; and
      (iii) an armature supporting annular pole piece comprising another portion of the armature cavity and axially spaced from the attracting pole piece;
   (e) said armature movably mounted in the armature housing cavity having:
      (i) a portion substantially overlapping the supporting pole piece; and
      (ii) a portion slightly overlapping the cavity forming end portion of the attracting pole piece;
   (f) means for providing an armature magnetic force that materially decreases as the valve member is moved from an initial closed position.

2. The valve of claim 1 wherein adjustable means are provided to axially position the armature in its cavity to determine the overlap with the cavity forming end portion of the attracting pole piece.

3. The valve of claim 1 wherein said fixed orifice in said valve member is located such that fluid flow from the inlet port to the outlet port through said fixed orifice whereby a pressure drop across the valve member increases with increased flow.

4. The valve of claim 3 wherein the increased flow creates a force tending to reduce the variable communication between the ports.

5. The valve of claim 3 wherein the increased flow is the result of an increase in inlet pressure.

6. The valve of claim 1 wherein said fixed orifice creates a pressure drop across said valve member that increases with increased flow.

7. The valve of claim 1 wherein there is a non-magnetic attached annular member separating the permeable portions of the annular pole pieces.

8. The valve of claim 1 wherein the annular pole pieces are axially spaced by a non-magnetic member that is constructed as an integral part of the armature support means.

9. The valve of claim 1 wherein the valve member is spring biased to said initial position.

10. The valve of claim 9 wherein said valve element is spring biased by a spring having a low force and low spring rate.

11. The valve of claim 1 wherein the inlet port extends axial at one end of the valve member and the outlet extends radially from the valve member.

12. The valve of claim 1 wherein said variable orifice structure is an annular groove on the valve member arranged to variably communicate with a plurality of holes in the valve cavity housing.

13. The valve of claim 12 wherein the groove initially is not in communication with the holes and valve member movement causes gradual communication of the groove with the holes.

* * * * *